United States Patent [19]

Kreitman et al.

[11] Patent Number: 5,303,388
[45] Date of Patent: Apr. 12, 1994

[54] METHOD TO DISPLAY AND ROTATE A THREE-DIMENSIONAL ICON WITH MULTIPLE FACES

[75] Inventors: Kristee Kreitman, San Francisco; Joy Mountford, Mountain View, both of Calif.

[73] Assignee: Apple Computer, Inc., Cupertino, Calif.

[21] Appl. No.: 52,865

[22] Filed: Apr. 23, 1993

Related U.S. Application Data

[63] Continuation of Ser. No. 521,067, May 9, 1990, abandoned.

[51] Int. Cl.$^5$ ............................................. G06F 15/62
[52] U.S. Cl. .................................... 395/159; 395/137
[58] Field of Search ............................. 395/119-127, 395/155-161; 340/706, 709-710, 723-724; 358/90; 345/126, 121-122, 902

[56] References Cited

U.S. PATENT DOCUMENTS

| | | | |
|---|---|---|---|
| 4,601,003 | 7/1986 | Yoneyama et al. | 395/159 |
| 4,685,070 | 8/1987 | Flinchbaugh | 395/124 |
| 4,813,013 | 3/1989 | Dunn | 395/159 |
| 4,866,638 | 9/1989 | Cosentino et al. | 395/159 |
| 4,899,136 | 2/1990 | Beard et al. | 395/159 X |
| 4,901,221 | 2/1990 | Kodosky et al. | 395/159 |
| 4,905,163 | 2/1990 | Garber et al. | 395/63 |
| 4,914,568 | 4/1990 | Kodosky et al. | 395/275 |
| 5,019,809 | 5/1991 | Chen | 340/706 X |
| 5,072,412 | 12/1991 | Henderson, Jr. et al. | 395/159 |

OTHER PUBLICATIONS

Tyson, R. Henry and Scott E. Hudson, "Multidimensional Icons", ACM Transactions on Graphics, Jan. 1990, pp. 133-137.
Chen et al., "A Study in Interactive 3-D Rotation Using 2-D Control Devices", Computer Graphics, Aug. 1988, pp. 121-129.
Brennan, "Microtecture boosts CAD software with database, 3-D program", PC Week, Jun. 14, 1988, p. 30(1).
Hordeski, "The Illustrated Dictionary of Microcomputers", 3rd Ed., p. 167.
Custer, "Stacking the Deck", Mac User, Dec. 1987, p. 112(8).
Wesley, "A guide to Guide", Mac User, Jan. 1988, p. 126(5).
Hyper Card User's Guide, Apple Corp., 1988, pp. 1-161, 185-195.
Gregory M. Nielson and Dan R. Olsen, Jr., "Direct Manipulation Techniques for 3D Objects Using 2D Locator Devices," Interactive 3D Graphics, pp. 175-182 (Oct. 23-24, 1986).
Ivan E. Sutherland, "Three-Dimensional Data Input by Tablet," reprinted from Proceedings of the IEEE, pp. 266-274 (Apr. 1974).
French Search Report dated May 7, 1993.
"Mail-Waiting Icon for PC-based Office System", IBM Technical Disclosure Bulletin, vol. 32, No. 6B, Nov. 1989, pp. 173-174.
T. Ichikawa et al., "Visual Programming—Toward Realization of User-Friendly Programming Environments", Exploring Technology: Today and Tomorrow—Proceedings of the Fall Joint Computer Conference, Oct. 25-29, 1987 Dallas, (IEEE Computer Society, 1987) pp. 129-137.

*Primary Examiner*—Heather R. Herndon
*Assistant Examiner*—John E. Breene
*Attorney, Agent, or Firm*—Blakely, Sokoloff, Taylor & Zafman

[57] ABSTRACT

A manipulable icon is displayed with multiple faces having particular application to computer displays and systems. The icon, which represents information about an object available within the computer, can be manipulated by the user to display different faces or views which provide additional information about the object represented by the icon. The user has the ability to manipulate the icon to see additional views of the icon on the computer display device, either by a mouse stroke selection command, keyboard command or menu selection. This selection causes the icon to move from one view or face of the icon to another view or face of the icon. These additional views thus provide additional space in which the icon can supply additional information to the user. Iconic movement from one face or view to another is also typically accompanied by some sound which indicates execution of the movement.

16 Claims, 6 Drawing Sheets

FIG_1 (PRIOR ART)

FIG_2

FIG_3

FIG_4

FIG_5

FIG_6

FIG_7

FIG_8

FIG_9A

FIG_9B

FIG_12

FIG_13

METHOD TO DISPLAY AND ROTATE A THREE-DIMENSIONAL ICON WITH MULTIPLE FACES

This is a continuation of application Ser. No. 07/521,067, filed May 9, 1990, now abandoned.

BACKGROUND OF THE INVENTION

(1) Field of the Invention

This invention relates to the field of controlling and manipulating display icons which are representative of objects such as documents, files and computer programs. These iconic representations are generally used to indicate, on the video display of a computer monitor, the documents, files and programs available within the computer. These iconic representations are also used in associated materials such as user's manuals, reference books and as trademarks.

(2) Description of the Related Art

In the context of computer technology, an icon is an image depicted on the display of a computer as a symbolic representation of information about objects available within that computer. An example of an icon based display system is the Macintosh ® computer system manufactured by Apple Computer, Inc., of Cupertino, Calif. Icons provide a preferable means of representing such information because icons can be quickly and easily identified by a user and because icons generally use less space than do standard textual representations of the same information. In addition, icons are generally considered to be more visually and logically appealing to users than text. For example, an icon which depicts a file folder instantly tells the user that this object may contain multiple documents. Conversely, if mere text was used to represent an object and the name used was ambiguous, such as "client listings", the user might not know whether that object contained multiple documents, or whether that object was only a single document possibly containing listings relating to a particular client.

While the method in which an icon imparts information about an object may be advantageous, an icon is generally limited to representing information about only one particular aspect of the object and cannot easily concatenate additional information about that object which would also be desirable to the user. This problem has been addressed in the past by changing the icon's size to display a larger image containing more information, or by providing the user with certain commands which would cause the computer to display supplemental textual information about the object.

SUMMARY OF THE INVENTION

An icon with multiple faces having particular application to computer displays and systems is disclosed. The icon, which represents information about an object available within the computer, can be manipulated by the user to display different faces or views which provide additional information about the object represented by the icon. In one embodiment, the icon with multiple selectable faces allows the user, either by a mouse stroke selection command, keyboard command or menu selection, to select which additional information and which associated display face is to be displayed next. This selection causes the icon to move from one view or face of the icon to another view or face of the icon. These additional views thus provide additional space in which the icon can supply additional information to the user. Iconic movement from one face or view to another is also typically accompanied by some additional form of feedback, such as color changes or sound, which further indicates execution of the movement.

DETAILED DESCRIPTION OF THE INVENTION

A manipulable icon having particular application to computer display systems is disclosed. In the following description, for purposes of explanation, specific methods, techniques and configurations are set forth in order to provide a thorough understanding of the present invention. However, it will be apparent to one skilled in the art that the present invention may be practiced without these specific details. In other instances, well known systems and techniques are shown in diagrammatical or block diagram form in order not to obscure the present invention unnecessarily.

Figure 1:
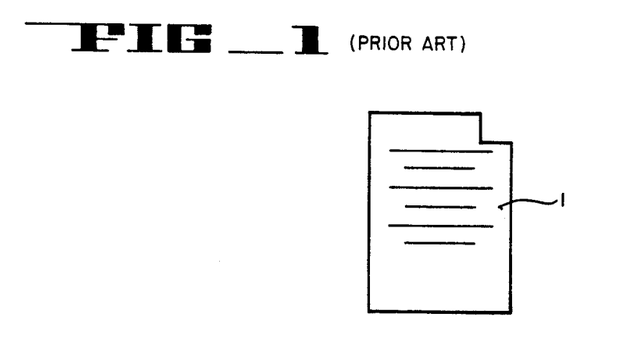
FIG. 1 shows a prior art icon.
Figure 2:
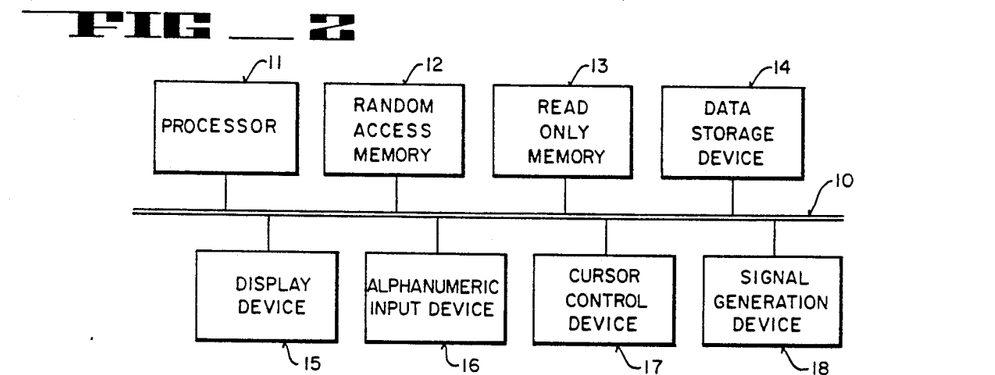
FIG. 2 shows a representative computer system capable of supporting the present invention.

Referring now to FIG. 1, a prior art icon 1 is shown of the type commonly used in computer systems, such as the Macintosh ® computer by Apple Computer, Inc., Cupertino, Calif. In general, as illustrated by FIG.

2, such systems comprise a bus 10 for communicating information, a processor 11 coupled with said bus 10 for processing information, a random access memory 12 coupled with said bus 10 for storing information and instructions for said processor 11, a read only memory 13 coupled with said bus 10 for storing static information and instructions for said processor 11, a data storage device 14 such as a magnetic disk and disk drive coupled with said bus 10 for storing information and instructions, a display device 15 coupled to said bus 10 for displaying information to the computer user, an alphanumeric input device 16 including alphanumeric and function keys coupled to said bus 10 for communicating information and command selections to said processor 11, a cursor control device 17 coupled to said bus 10 for communicating information and command selections to said processor 11, and a signal generation device 18 coupled to said bus 10 for communicating command selections to said processor 11.

The display device 15 may be a liquid crystal device, cathode ray tube, or other suitable display device. The cursor control device 17 allows the computer user to dynamically signal the two or three dimensional movement of a visible symbol on a display screen of said display device 15. Many implementations of the cursor control device are known in the art including trackballs, mouses, joysticks, or special keys on the alphanumeric input device 16 capable of signaling movement in a given direction.

These computer systems also typically contain operating system software. The operating system contains program logic capable of controlling the operation and resources of the computer system. The system program logic executed by the processor 11 provides system support for the present invention in the display of icons and the sensing of icon face or object information.

Figure 3:
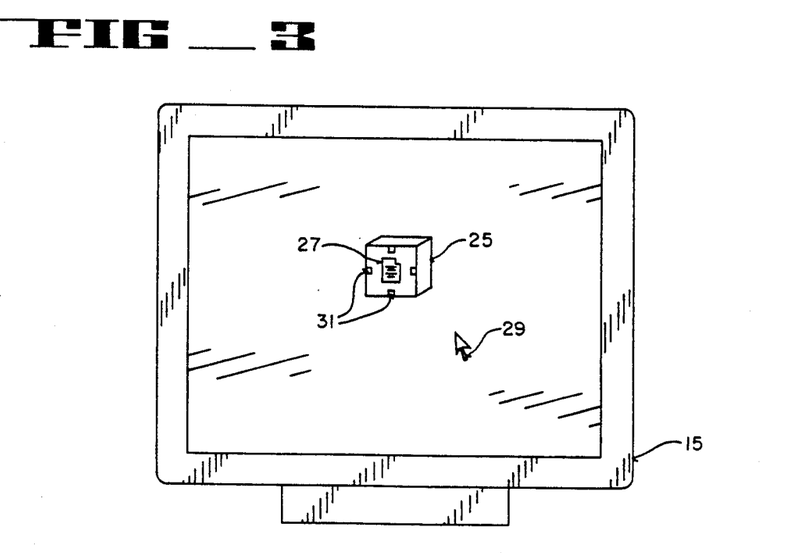
FIG. 3 shows a three-dimensional representation of a manipulable icon of the present invention as it might appear on a computer display.

Typically, icons are displayed on the display device 15 to depict an object such as a program, file or document in a stationary visual representation. For instance, a word processing application can be represented by an icon depicting the generation of text (for instance, a typewriter), while a document created by that word processing program can be represented by an icon depicting a typical document (for instance, a business letter or the prior art icon of FIG. 1). Referring now to FIG. 3, a manipulable icon 25 of the preferred embodiment of the present invention is shown as it might appear on the screen of the display device 15. The icon 25 is shown generally by a three-dimensional cubic manipulable icon with multiple selectable faces, one of which displays a standard two dimensional image 27 corresponding to the type of object being represented by the icon 25. The manipulable icon 25 is similar to standard two dimensional icons in that it displays an image 27 representing an object stored in the computer's memory, but is distinguishable because the icon can be used to allow the user to alternatively view different types of information about the object and/or to display additional information about the object through manipulation of the icon.

The small arrow 29 is a cursor, in communication with a cursor control device 17 and a signal generation device 18 (such as a mouse having a selection button), which can be used to manipulate icon 25 so as to change its position on the display screen or to select additional information about the object represented by the icon 25 by changing its orientation. In the particular embodiment shown, the position of the icon 25 on the display screen can be changed by moving the cursor 29 to a central portion of the icon 25 and holding down the selection button of the mouse while dragging the icon 25 to a new position on the screen 15. To change the type of information being represented by the icon 25, the user would change the icon's orientation by positioning the cursor over one of the icon button markers 31 (more closely illustrated in FIG. 4) and then clicking and releasing the selection button of the mouse to select the marker. In response to this latter action, the icon 25 would then rotate in the particular direction selected and display additional information about the program, file or document (object) represented by the icon 25.

Figure 4:
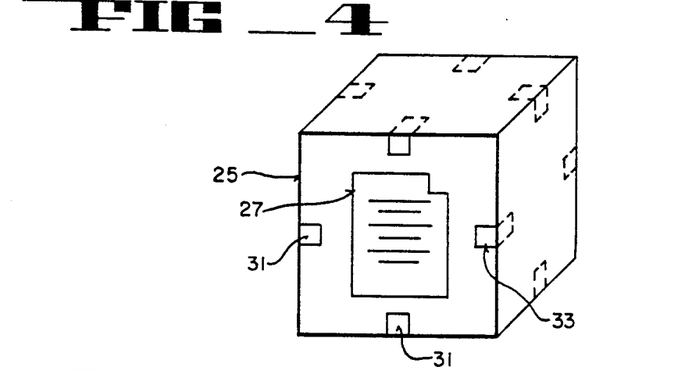
FIG. 4 shows a three-dimensional representation of a manipulable icon of the present invention.
Figure 5:
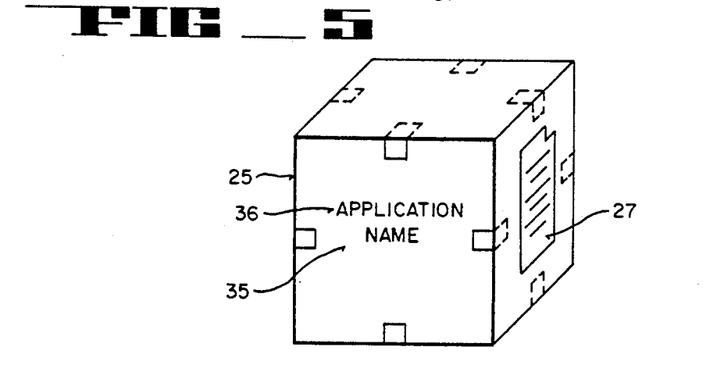
FIG. 5 shows a three-dimensional representation of a manipulable icon of the present invention after having been moved 90 degrees to the right.

For example, as depicted in FIGS. 4 and 5, if the user was to click on the icon button 33, the icon 25 would rotate to the right and display a different face 35 containing additional information 36 about the object represented by the icon, such as a description of the type of application program (represented by the words "APPLICATION NAME") used to create the text document represented by the image 27. Additional faces of the icon cube 25, a total of five faces in this particular embodiment, might also be used to display information about the object, such as its size, its creator, appropriate copyright and patent notices, the last date on which the document was modified, etc. Although a cubic structure, such as the icon 25, would normally have a total of six faces on which information could be displayed, icon cube 25 is limited to only five displayable faces (or an alternatively preferable four displayable faces) so as to prevent user confusion when turning the icon. Instead of providing a sixth face which can be accessed from four different sides, icon 25 always returns to the original front face anytime the user attempts to consecutively manipulate the icon 25 in the same direction. If so desired, however,-icon 25, or any iconic structure, could be designed so that every face or fewer faces are accessible to the user.

Figure 6:
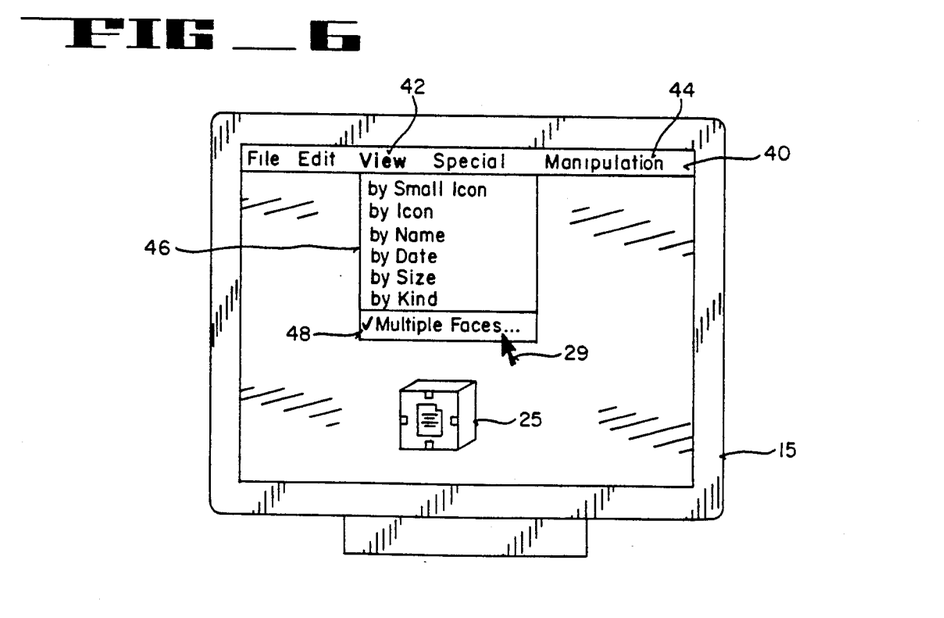
FIG. 6 shows a three-dimensional representation of a manipulatable icon of the present invention as it might appear on a computer display when selected to be shown in three-dimensions through a menu selection command.
Figure 7:
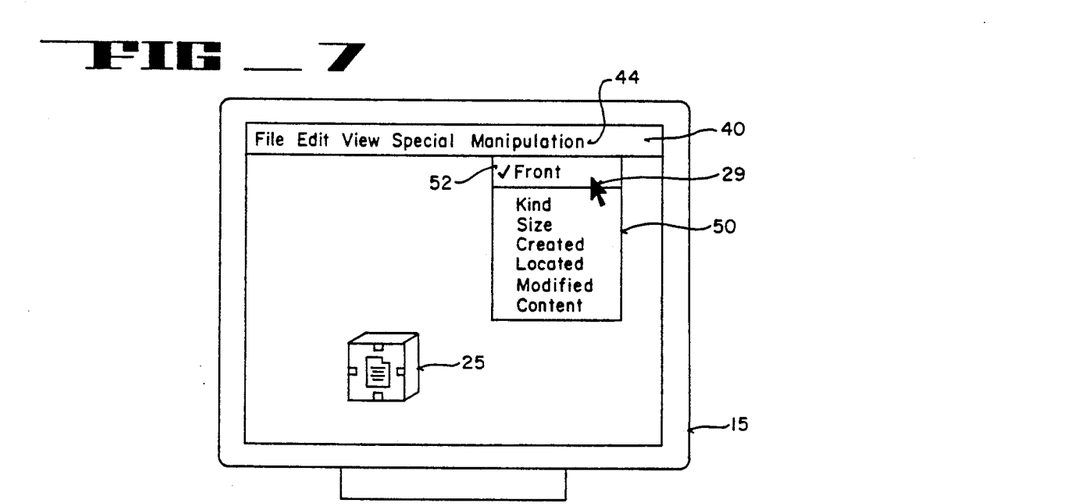
FIG. 7 shows a three-dimensional representation of a manipulatable icon of the present invention as it might appear on a computer display when selected to be manipulated through a menu selection command.

It should be noted that manipulation of the icon 25, such as through means of the icon buttons 31 can be implemented in a wide variety of different manners. As shown in FIGS. 4 and 5, icon buttons 31 are visibly displayed along the four edges of the front facing side of the cube 25, while icon buttons for the other faces of the cube are not displayed (shown as dotted lines in these figures for illustration purposes only). Just as readily, however, visible icon buttons 31 could be displayed on the edge of every partially visible face of the icon cube 25, such that the user could cause any face of the icon 25 to be displayed by entering a single command from the signal generation device 18. Likewise, referring now to FIGS. 6 and 7, it is also possible to select the type of manipulable icon 25 to be displayed and to manipulate the selected type of icon 25 through menu selection commands, instead of through direct manipulation of the object. FIGS. 6 and 7 illustrate icon 25 on the screen of a display device in communication with a computer system having the ability to generate a menu bar 40 across the top of the screen, a technique well known by persons of ordinary skill in the art. In addition to standard menu selections, such as File (for opening, closing, saving, etc., files), Edit (for deleting, copying, pasting, etc., data within a file) and Special (for performing auxiliary functions, such as shutting the computer system down), menu bar 40 also includes the menu selections View 42 and Manipulation 44.

The View menu selection 42 is similar to a standard View menu selection which typically includes commands for viewing the icons as either small or large two dimensional images, as well as by name, date, size and kind. The commands of most menu selections are made visible by performing the appropriate action which causes a window 46 of commands to be displayed. In FIGS. 6 and 7, window 46 is caused to be displayed by positioning the cursor 29 in the area of the displayed word corresponding to the menu selection and holding down on the selection button of the mouse. A command window is indicated as corresponding to a particular menu selection by highlighting that menu selection in some manner, such as illustrating the menu selection word in outline font characters.

To select a particular command, the user continues to hold down on the selection button of the mouse while moving the cursor down the list of commands until it is positioned over the desired command to be performed. In FIG. 6 for example, the desired command to be performed is to view the icon 25 with Multiple Faces, or in other words, in three dimensions. Using well known techniques for selecting a number of different icons on the display (i.e., holding down the Shift key while entering commands from the signal generation device 18), the Multiple Faces command could also be used to view the selected icons in three dimensions while leaving unselected icons in standard two dimensional form. As shown, this command as has been selected, so a small arrow 48 is inserted before the command to indicate that the command is already active. The user could also be provided with additional options under the Multiple Faces command which would allow the user to view three dimensional icons by size, date, kind, etc., as is possible with standard two dimensional icons, such as is shown in FIG. 6.

it is also well known in the art to perform menu commands by entering certain key or function characters from an alphanumeric input device 16, such as a keyboard (i.e., simultaneously pressing the keys "Control" and "M" to enter the menu selection command for Multiple Faces, rather than pulling down the command menu box and selecting the command with the mouse). Also, depending on the type of command selected, activation of the command can either cause the command to be carried out or an additional command box to be displayed (which is a technique well known in the art and which need not be illustrated here for an understanding of the present invention). The continuation characters "..." appearing after the command Multiple Faces indicate that selection of that command will cause an additional command box to be displayed, which in this particular instance, may be utilized to select the type of geometrically configured icon to be utilized to represent the object stored in the computer.

While an icon is being displayed in a three dimensional form, the menu selection Manipulation 44 would provide a means for controlling the rotation of that icon through menu selection commands, such as is illustrated in FIG. 7. Selecting Manipulation 44 from the menu bar 40 would cause command window 50 to drop down from the menu bar 40 and the word Manipulation on the menu bar 40 to be highlighted. From the command window 50, the user could then select any of a number of different commands, such as Front, Kind, Size, Created, Located, and Modified, which would then cause the icon 25 to turn to whatever side of the icon is capable of displaying that type of information. As previously mentioned, any of these commands could likewise be performed through the entry of corresponding key commands from a keyboard. As shown in FIG. 7, the manipulation command Front 52 has been selected by the user controlled cursor 29 and is currently active such that icon 25 is displayed on the screen so as to fully depict its front face. In addition, other commands, such as Content or Feedback, could also be provided in command window 50. The Content command would cause the icon, in either two or three dimensional form, to display an animated depiction of the content of the object represented by the icon 25. The Feedback command would cause the icon's movement from one face or view to another to be indicated by some sort of audible or visual feedback, other than the movement of the icon 25 itself, such as a swishing sound or a color change, thereby indicating execution of the movement.

Figure 8:
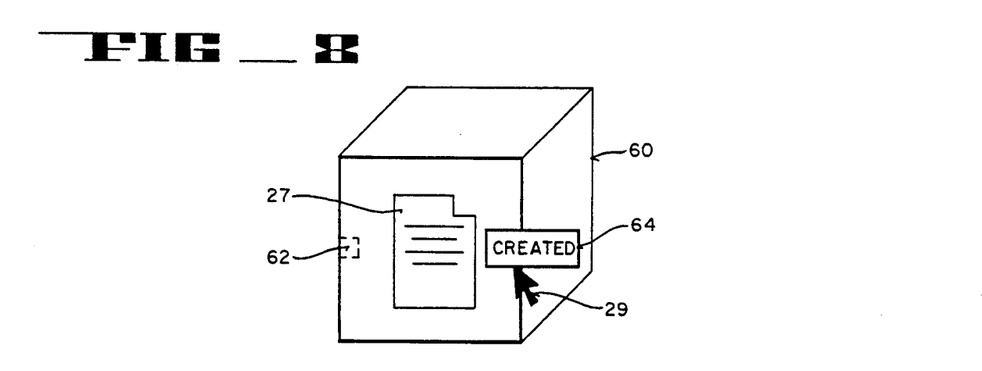
FIG. 8 shows a first alternative embodiment of a three-dimensional representation of a manipulable icon of the present invention.

A first alternative embodiment of the present invention is depicted in FIG. 8, wherein a manipulable icon 60 having invisible cursor sensitive hotspots 62, instead of visible icon buttons, is illustrated. A hotspot 62 can be used to manipulate the orientation of the icon 60 in essentially the same manner as would an icon button, but certain characteristics of its operation can differ significantly. The process of changing the type of information represented by icon 60 (without using menu selections) is as follows: the user first moves the cursor 29 toward a selected edge of the icon 60, which represents the direction the icon 60 is desired to turn, and positions the control point of the cursor 29 over the general vicinity of an invisible hot spot; then, when the computer senses that the cursor is over a hotspot and correspondingly generates a visible message 64 connoting that the hotspot has been detected, the user clicks and releases the selection button of the mouse, thereby causing the icon 60 to rotate in the particular direction selected and to display additional information about the program, file or document (object) represented by the icon 60. As shown in FIG. 8, the computer generated message 64 indicates that selection of that hotspot would be equivalent to performing the menu command "Created", but as should be well understood, many other types of messages could also be generated.

Figure 9A:
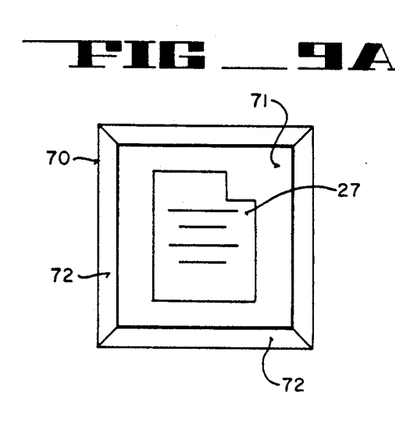
FIGS. 9a and 9b show a second alternative embodiment of a three-dimensional representation of a manipulable icon of the present invention.
Figure 9B:
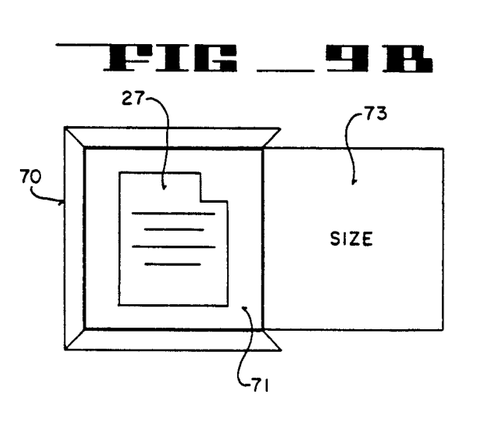

A second alternative embodiment of the present invention is depicted in FIGS. 9a and 9b, which show a manipulable icon 70 having a geometric configuration other than that of the cubic icons illustrated above. It should be understood that a manipulable icon image can be constructed in accordance with any of a wide number of geometric configurations, such as pyramids and polyhedrons, and that the particular embodiments depicted herein are by no means limiting.

For example, manipulable icon 70 is a depiction of an open "shoebox" type icon, in that it has a fully visible bottom face 71, upon which the presently desired information is displayed, and four side walls 72, which can be manipulated by the user to display additional information about the object represented by the icon 70. If the user desires to display the information contained on the right side of the shoebox icon 70, the user simply positions a cursor over wall 73, which has means for manipulating the orientation of the icon 70, such as an icon button or hotspot, and clicking and releasing the selection button of the mouse. This latter action would then cause wall 73 to drop down to a position planar with the bottom view 71 (i.e., perhaps in the form of an overlapping window so as to not be obscured by nearby displayed information or icons), as illustrated in FIG. 9b, so as to reveal additional information about the object represented by the icon 70, such as its size. An advantage of this type of iconic imaging and manipulation is that all of the information about the object could be simultaneously displayed. However, as indicated above, there are many ways that such an iconic representation could be implemented, i.e., rather than having wall 73 drop down to a position planar with the bottom view 71, wall 73 could be made to slide down from its present position and replace bottom view 71.

Figures 10A, 10B, 11:
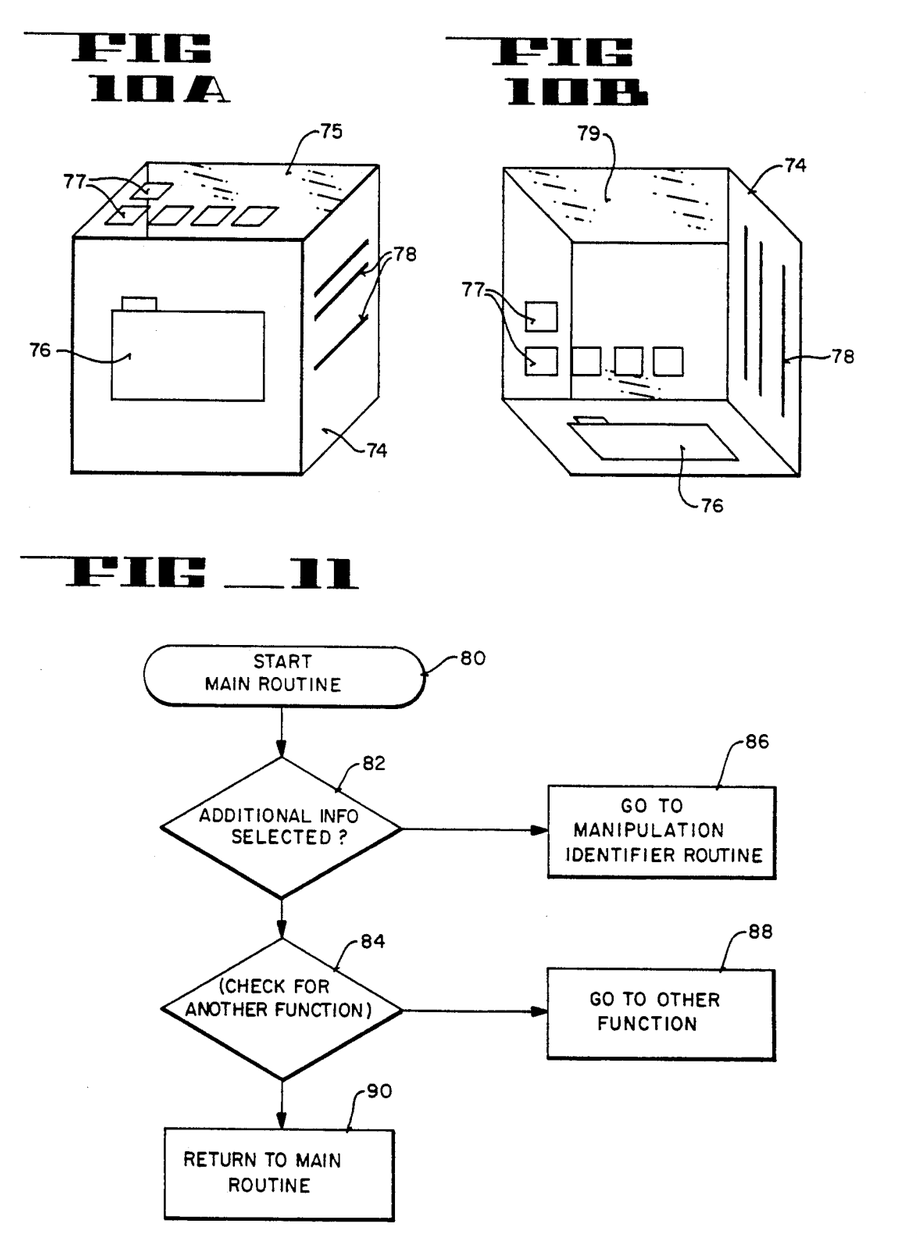
FIGS. 10a and 10b show three-dimensional representations of a manipulable icon in accordance with a third alternative embodiment of the present invention.
FIG. 11 shows a flowchart of the steps taken by the computer operating system in detecting the user selection of the command for additional information.

A third alternative embodiment of the present invention is depicted in FIGS. 10a and 10b. These figures illustrate an icon cube 74, having five opaque faces and one seemingly translucent face 75, which is utilized to represent information about a certain object stored in the data storage device 14, such as the file folder 76. The file folder 76, in turn, represents a collection of additional objects 77, placed within the file folder 76 and stored in the data storage device 14. Although depicted as having six sides or faces, icon cube 74 could also be configured to have five opaque faces and no sixth face, so as to create a visual image similar to the shoebox icon depicted in FIG. 9a, but perhaps better illustrative of an open three dimensional box.

When the icon cube 74 is configured and oriented as depicted in FIG. 10a, the user can readily determine the number of objects 77 contained by the folder 76 by simply looking at the translucent face 75 of the icon cube 74 where the objects 77 are positioned. If the icon cube 74 was to be configured without the translucent face 75, such that the objects 77 were positioned within the box formed by the open icon cube 74, the objects 77 would probably not be visible to the user when the icon cube was oriented as shown in FIG. 10a, but would be visible to the user when the orientation of the icon cube 74 was changed so that the user could look into the open box of the icon cube 74. As in the other embodiments, additional information 78 about the file folder 76 or objects 77 could also be illustrated on the other faces of the icon cube 74.

In addition, the icon cube 74 and each object 77 can be configured to allow the user to select a particular object 77, thereby allowing the user to open a document associated with that object or to move the object 77 in or out of the file folder. If the objects 77 are to be made selectable by the user, however, some means must preferably be provided to allow the user to identify the contents of each object from the icon cube 74, such as a pop-up description of the object when the object is selected, or a simple iconic image or name. Even without the provision of a means for identifying each object from the icon cube 74, this feature is still useful however because the user can simply open one of the objects 77 to determine its contents as well as its relationship to the other objects 77 in the file folder 76.

Icon cube 74 can be manipulated in accordance with the manipulation techniques described above in relation to the other embodiments, or in other manners consistent with the present invention. For example, a number of software programming techniques known in the art for manipulating the orientation of a three dimensional object using a two dimensional cursor control device 17 (i.e., a mouse, joystick, trackball, touch screen, etc.), in combination with a signal generation device 18, could be applied to any of the various embodiments of the present invention. In accordance with one such technique, the orientation of the three dimensional object can be changed through software programs by grabbing a portion of the three dimensional object to be moved with the mouse and moving the mouse around while continuously activating the signal generation device.

Manipulable icons should also be spring-loaded so that regardless of the orientation that the icon has been moved to, the icon will always automatically return to its original front face. This spring action could also be implemented in a number of different manners. A spring return could be initiated when the user deactivates the selection button of the mouse, or after some delay period, etc., thereby alleviating the user from having to search for the front face after having manipulated the icon several times.

It should also be noted that the type of geometric configuration used for the icon can affect the user's comprehension and possibly prevent the user from becoming disoriented by the moving icon. Another advantage of using a cubic or three-dimensional representation is that it allows more intuitive placement of the sensitive areas on the icon. For instance, a sensitive area at a midpoint along one side of the cube of the icon, as shown in FIG. 3, would signal the user as to which direction the icon would move if that button were selected, specifically, movement towards that direction. It is important to note that in the preferred embodiment, the icon would immediately move or snap from one face to another face of the icon. However, alternative methods such as a gentler rotation of the icon, fade-out of one face and fade-in of another face, or even transitional wipes of the icon from one view to another, could also be employed while still adhering to the spirit of this invention. It should also be noted that the use of different colors or designs for each face can make each face more distinguishable for the user.

Referring now to FIG. 11, an example of the particular steps taken to implement the preferred embodiment of a manipulable icon of the present invention are shown. As described above, once the icon is selected to be displayed in a manipulable mode (by, for instance, a menu selection command such as "View Multiple Faces"), areas within the icon, which are sensitive to mouse selection commands, or other commands are used to cause the icon to perform various manipulations with regard to its orientation. According to the preferred embodiment of the present invention, the system program includes new, additional capabilities to handle the "View Multiple Faces" menu selection command as well as other commands, icon movements and image displays. Upon activation of the "View Multiple Faces" command, a Main Routine 80 of the system program is initiated. The Routine 80 operates by continually polling the computer system to see if the user has requested additional information 82 about an object or selected another function 84 which has been made a part of the Routine 80. If the user has selected additional information about an object, regardless of the manner of doing so, the Routine 80 calls a Manipulation Identifier Routine 86, which operates to identify and direct the handling of the selected manipulation type. Otherwise, the appropriate function routine 88 corresponding to the other selected function 84 or a Return 90 to the Main Routine 80 is called.

Figure 12:
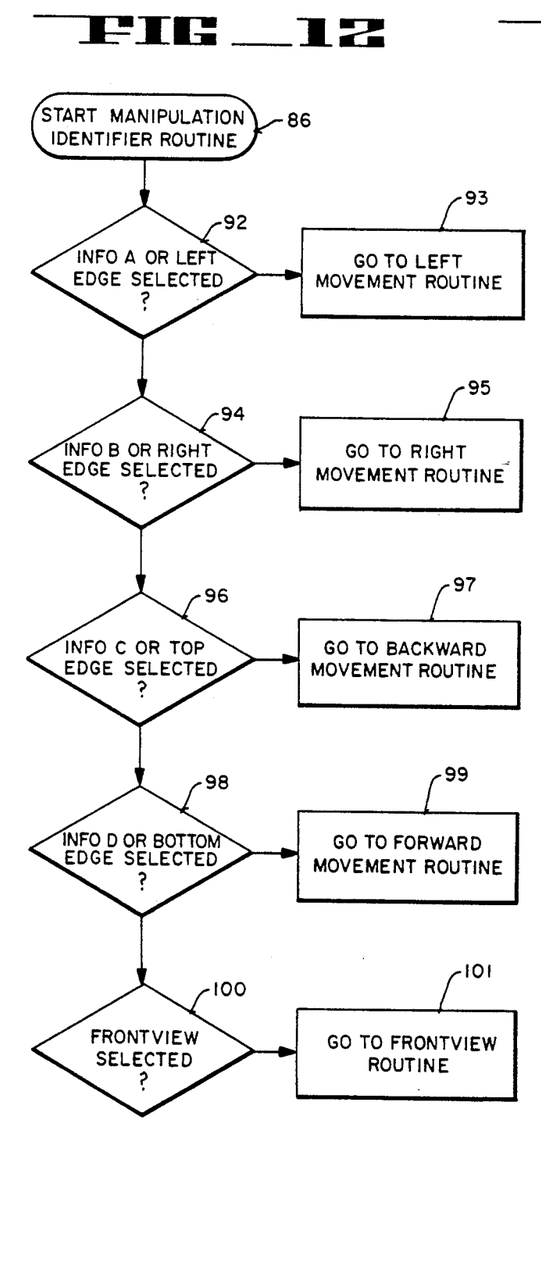
FIG. 12 shows a flowchart which determines how to move a manipulable icon once the user has selected a particular movement of the manipulable icon.

The Manipulation Identifier Routine 86, shown in FIG. 12, polls the various menu selections as well as the various sensitive areas to determine which has been selected. Once the selected command has been determined, the routine which handles the movement in that direction is called. For instance, if Information A or Left Edge 92 of the displayed manipulable icon is selected, the routine which handles a left movement 93 is called. Right Edge 94, Top Edge 96, Bottom Edge 98, and Front Edge 100 selections are handled in a similar manner by calling the Right Movement 95, Backward Movement 97, Forward Movement 99, or Front Movement 101 routines respectively.

Figure 13:
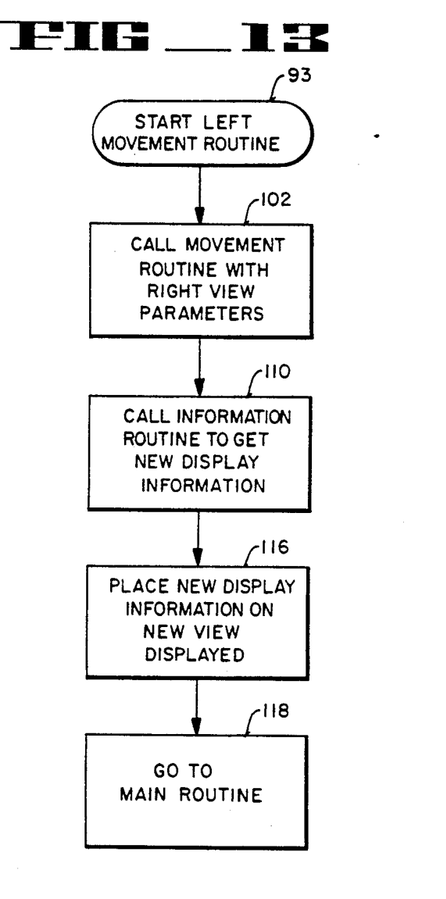
FIG. 13 shows a flowchart of a left movement of a manipulable icon to its right view.
Figure 14:
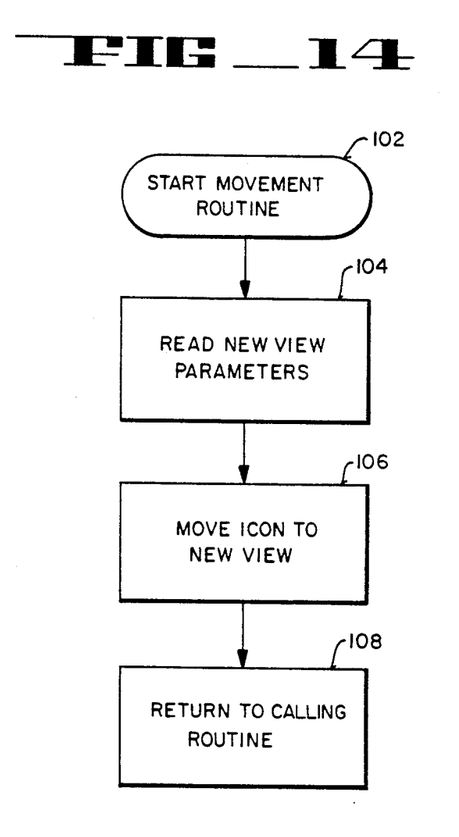
FIG. 14 shows a flowchart of a routine which handles the movement of a manipulable icon.
Figure 15:
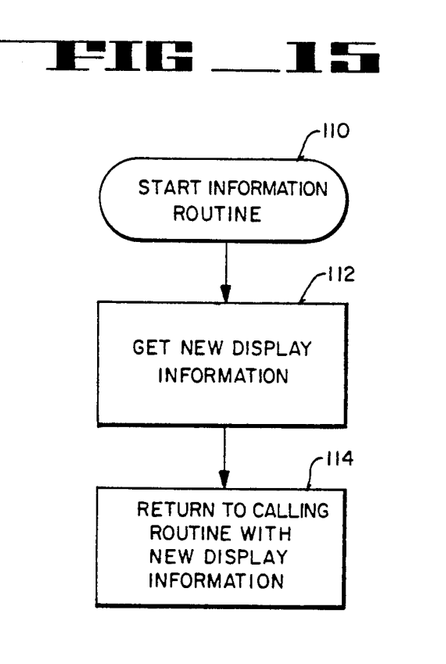
FIG. 15 shows a flowchart of a routine which gathers the new display information for a manipulable icon which has been moved to a new view.

As shown in FIG. 13, if the Left Movement Routine 93 is called, the Movement Routine 102 having the proper icon parameters (e.g., icon location, current icon face, new icon face, index to front face, etc.) for that particular move is activated. In this case, since the movement of the cubic icon is to the left, the Movement Routine 102 for right view parameters of the icon would be selected. The called Movement Routine 102, further shown in FIG. 14, first reads the new icon parameters 104 for the new view to be displayed, then moves the icon to that new view 106 and returns 108 to the calling routine, which in this case was the Left Movement Routine 93. When the Left Movement Routine 93 regains control, referring again to FIG. 13, the Information Routine 110 is called, so as to get the new display information for the new view. The Information Routine 110, shown in FIG. 14, first gets the new display information 112, for instance the creator, size, or last modification date, and then returns 114 to the calling routine, which was the Left Movement Routine 93, with the new display information. When the Left Movement Routine 93 again regains control, once more referring back to FIG. 13, the new display information is placed 116 on the new icon view being displayed. Lastly, the Left Movement Routine 93 returns 118 to the Main Routine 80, referring again to FIG. 11.

Icon designs should also be consistently mapped to cut down on user confusion and frustration when using such icons, i.e., it may be desirable to always have the same type of information displayed on the same face of different icons.

Although the present invention has been described with reference to FIGS. 1–15 and with emphasis on a specific manipulation of a particular type of iconic image, it should be understood that the figures are for illustration only and should not be taken as limitations upon the invention. It is contemplated that many changes and modifications may be made, by one of ordinary skill in the art, to the invention, or the process and arrangement of steps of the process of the invention without departing from the spirit and scope of the invention as disclosed above.

We claim:

1. A method of manipulating a three-dimensional icon on a display screen of a computer system, wherein the three-dimensional icon includes a plurality of faces, each face containing at least one displayed item which is associated with an object stored in the computer system, a first face containing a two-dimensional icon representing a folder or file stored in the computer system and other faces of the three-dimensional icon displaying attributes of said folder or said file, wherein the plurality of faces are joined together to form the three-dimensional icon, wherein the method comprises the steps of:

(A) marking a first button marker on the first face of the plurality of faces of the three-dimensional icon, wherein the first marker associated with a second face of the plurality of faces of the three-dimensional icon, wherein the first face is joined with the second face, when the first face is displayed front most on the display screen and the first button marker is activated by using a cursor control device to position a movable cursor displayed on the display screen onto the first button marker, the three-dimensional icon is rotated such that the second face is displayed front most on the display screen, wherein the movable cursor is controlled by the cursor control device of the computer system to move on the display screen;

(B) marking a second button marker on the second face that is associated with the first face, when the second face is displayed front most and the second button marker is activated by using the cursor control device to position the movable cursor onto the second button marker, the three-dimensional icon is rotated such that the first face is displayed front most;

(C) rotating the three-dimensional icon by activating the first button marker with the movable cursor to display the second face front most; and (D) rotating the three-dimensional icon by activating the second button marker with the movable cursor to display the first face front most.

2. The method of claim 1, wherein each of the first and second button markers is an invisible cursor sensitive spot.

3. The method of claim 1, wherein when the second face is displayed front most, the first button marker is not displayed on the screen, when the first face is displayed front most, the second button marker is visible on the display screen.

4. The method of claim 1, further comprising the step of forming the first and second button markers proximate to a first edge, wherein the first face is joined with the second face at the first edge.

5. The method of claim 1, wherein the first face is joined with a number of plurality of faces at a number of edges, further comprising the step of forming a plurality of button markers on the first face, each button marker being proximate to one of the number of edges and corresponding to one of the number of the plurality of faces that are joined with the first face, when a one of the plurality of button markers is activated by the movable cursor, a corresponding one of the number of the plurality of faces is displayed front most.

6. The method of claim 1, wherein the three-dimensional icon is a cube.

7. The method of claim 1, wherein the three-dimensional icon is a polyhedron.

8. The method of claim 7, wherein the three-dimensional icon is a box, wherein all of the plurality of face of the three-dimensional icon can be seen on the display screen.

9. The method of claim 1, wherein one the plurality of faces of the three-dimensional icon is a translucent face such that other faces of the three-dimensional icon can be seen through the translucent face and other faces of the three-dimensional icon are opaque faces.

10. The method of claim 1, wherein each of the first and second button markers is visible and generates a signal by activating a signal generation means when the movable cursor is placed on the respective button marker in order to rotate the three-dimensional icon.

11. The method of claim 10, wherein the signal generation means is a button on the cursor control device.

12. The method of claim 11, wherein the cursor control device is a mouse.

13. A method of manipulating a three-dimensional icon on a display screen of a computer system, wherein the three-dimensional icon includes a plurality of faces, each face containing at least one displayed item which is associated with an object stored in the computer system, the plurality of faces are joined together to form the three-dimensional icon, a first face containing a two-dimensional icon representing a folder or file stored in the computer system and other faces of the three-dimensional icon displaying attributes of said folder or said file, the method comprises the steps of:

(A) marking a first button marker on the first face of the plurality of faces of the three-dimensional icon, wherein the first marker associated with a second face of the plurality of faces of the three-dimensional icon, when the first face is displayed front most on the display screen and the first button marker is activated, the three-dimensional icon is rotated such that the second face is displayed front most on the display screen;

(B) rotating the three-dimensional icon by activating the first button marker to display the first face front most.

14. The method of claim 13, further comprising the steps of:

(C) marking a second button marker on the second face that is associated with the first face, when the second face is displayed front most and the second button marker is activated, the three-dimensional icon is rotated such that the first face is displayed front most;

(D) rotating the three-dimensional icon by activating the second button marker to display the first face front most.

15. The method of claim 13, wherein each of the first and second button markers is an invisible cursor sensitive spot.

16. The method of claim 13, wherein the first face is joined with a number of plurality of faces at a number of edges, further comprising the step of forming a plurality of button markers on the first face, each button marker being proximate to one of the number of edges and corresponding to one of the number of the plurality of faces that are joined with the first face, when a one of the plurality of button markers is activated by a movable cursor, a corresponding one of the number of the plurality of faces is displayed front most.

* * * * *

UNITED STATES PATENT AND TRADEMARK OFFICE
CERTIFICATE OF CORRECTION

PATENT NO. : 5,303,388
DATED : April 12, 1994
INVENTOR(S) : Kristee Kreitman and Joy Mountford It is certified that error appears in the above-indentified patent and that said Letters Patent is hereby corrected as shown below:

| COLUMN | LINE | |
|--------|------|---|
| 4  | 36 | change "-icon" to --icon-- |
| 5  | 35 | change "it" to --It-- |
| 10 | 35 | insert --the-- after "a number of" |
| 11 | 20 | change "first face" to --second face-- |
| 12 | 14 | insert --the-- after "a number of" |

Signed and Sealed this

Twenty-third Day of August, 1994

Attest:

BRUCE LEHMAN

*Attesting Officer*   *Commissioner of Patents and Trademarks*